United States Patent [19]

Beresford et al.

[11] 4,321,332

[45] Mar. 23, 1982

[54] POLYESTER RESIN GRANULES AND PROCESS

[76] Inventors: Michael P. Beresford, 36 Moody St., North Balwyn, Victoria, Australia, 3104; Willy Braun, 39 Glencairn Ave., Brighton, Victoria, Australia, 3187

[21] Appl. No.: 211,942

[22] Filed: Dec. 1, 1980

[30] Foreign Application Priority Data

Dec. 7, 1979 [AU] Australia .............................. PE1643

[51] Int. Cl.$^3$ ............................................ C12P 33/04
[52] U.S. Cl. ................................... 523/502; 525/19; 525/18; 525/17; 525/15; 525/13; 523/505; 521/62
[58] Field of Search ................... 260/29.6 NR, 29.6 E; 525/15, 17, 18, 13, 19; 521/62, 65, 182

[56] References Cited

U.S. PATENT DOCUMENTS

Re. 27,444  7/1972  Will ........................................ 521/62
3,879,314  4/1975  Gunning et al. ...................... 521/62

Primary Examiner—Joseph L. Schofer
Assistant Examiner—Bernard Lipman
Attorney, Agent, or Firm—Cushman, Darby & Cushman

[57] ABSTRACT

This invention relates to a process of preparing aqueous slurries of vesiculated granules of crosslinked polyester resin wherein the granules have a maximum shrinkage on drying of 5% of the granule diameter. Previously-known processes for the preparation of granules of this type have utilized polyamines; this has led to odor and color problems. These problems may be eliminated or substantially reduced by the use of bases which are metal oxides, hydroxides or salts wherein the metal cation is selected from Ca, Mg, Ba, Ti, Zn, Pb, Sr and Co and, when a metal salt is used, the pKa value of the conjugate acid of the anion is greater than 2. The resulting granules are useful at matting and opacifying agents in, for example, paint compositions.

6 Claims, No Drawings

POLYESTER RESIN GRANULES AND PROCESS

This invention relates to an improved process of preparing vesiculated polyester resin granules.

The technique of preparing porous articles from carboxylated, unsaturated polyester resin by emulsifying water into the polyester resin in the presence of a base and then polymerising the resin has been known for some time. For example, Will, in German Auslegeschrift No. 1,220,606, discloses such a process, using bases such as sodium, potassium and calcium hydroxides, ammonia and magnesium oxide to react with and neutralise the carboxyl groups of the polyester. An extension of this technique is the preparation of "double emulsions", that is, emulsions wherein the disperse phase is itself an emulsion. An example of this can be found in U.S. Pat. No. 3,255,137 where von Bonin and Bartl prepare porous polymeric materials which can be readily worked up industrially by dispersing water in a polymerizable liquid, dispersing the resulting emulsion in water and polymerizing the liquid. For the stabilization of the initial water-in-oil emulsion, von Bonin asserts that "there are in principle suitable all those emulsifiers which can be used for the production of reversed emulsions" of the particular polymerizable liquid used. U.S. Pat. No. 3,255,127 lists a substantial number of emulsifiers, including fatty acid salts of alkaline earth metals.

This was the state of the art when U.S. Pat. No. 3,822,224 issued. In this patent, Kershaw and Gillan describe a process of preparing vesiculated polyester resin granules by dispersing a selected styrene solution of carboxylated unsaturated polyester resin in an aqueous continuous phase in the presence of a selected base. Here, the vesicles formed spontaneously within the granules. However, if it was desired to include pigment within the granules, a particularly convenient way was to use a double emulsion process, which involved the dispersion of pigment in water, the dispersion of the pigment dispersion into the polyester solution to give an emulsion of pigment dispersion in polyester, and the dispersion of this emulsion into the base-containing aqueous phase. For the specialized purposes of this invention, the teachings of Will and von Bonin, which placed no restriction on the types of polyester or base, were inadequate; the polyester had to have an acid value falling within a specific range and the base had to be a strong base with a dissociation exponent of less than 8. Typical bases included sodium, lithium, potassium and ammonium hydroxides.

Granules of this type were useful for many purposes, but in some applications, the fact that these granules shrank on drying gave rise to unacceptable defects. This was very noticeable in paint compositions comprising such granules-films formed from such paint compositions often cracked on drying. This problem was overcome by Gunning, Henshaw and Lubbock in U.S. Pat. No. 3,879,314. In this patent Gunning found that granule shrinkage could be reduced to an acceptable level by a careful selection of both polyester acid value and base type. The bases which could be used in this invention were water-soluble polyamines having at least three amine groups per polyamine molecule and a pKa value of between 8.5 and 10.5, suitable examples being diethylene triamine and triethylene tetramine. Gunning shows conclusively in Example III of U.S. Pat. No. 3,879,314 that only amines having these characteristics will work; bases such as ammonia and triethanolamine which were favored by the abovementioned prior art will not give the desired results. In this patent, the amine appears to perform a dual function; it stabilizes the initial water-in-oil emulsion and it forms part of a redox curing system. The "dimensionally stable" granules produced by the process according to U.S. Pat. No. 3,879,314 are satisfactory for use as opacifying agents in coating compositions and such compositions have been commercially acceptable. However, these granules are not without their drawbacks. For example, the amine imparts a yellowish color to the granules and this is in turn imparted to coating compositions in which they are incorporated. A further disadvantage is the strong and often unpleasant odor of the amines; this is often detectable in the coating compositions and leads to some consumer resistance.

We have now found that it is possible to prepare dimensionally stable granules by a double emulsion process from which all the polyamine previously used for stabilization can be eliminated. We therefore provide, according to the present invention, a process of preparing an aqueous slurry of vesiculated granules of crosslinked polyester resin which granules are dimensionally stable as hereinunder defined, the process comprising the steps of (a) emulsifying water into a solution in essentially water-insoluble $\alpha, \beta$-ethylenically unsaturated monomer of a carboxylated unsaturated polyester resin, in the presence of a base, to give a stable emulsion of water in polyester solution;

(b) dispersing this emulsion into water containing a stabilizer for the resulting droplets of emulsion; and (c) initiating addition polymerization within the droplets to convert them to cross-linked vesiculated polyester resin;

characterized in that (i) the acid value of the polyester is from 5–50 mg. KOH/g;

(ii) the base is a metal oxide, hydroxide or salt wherein the metal cation is chosen from the group consisting of calcium, magnesium, barium, titanium, zinc, lead, strontium and cobalt and, where a metal salt is used, the pKa value of the conjugate acid of the anion is greater than 2; and (iii) the base is present to the extent of from 0.3 equivalents of metal cation per equivalent of polyester carboxyl group to that quantity required for the complete neutralization of all the carboxyl groups.

We further provide an aqueous slurry of dimensionally stable vesiculated granules of crosslinked polyester resin, prepared by the abovementioned process.

Granules prepared by the process according to this invention have the advantage of being amine-free, and they are thus free from the consequent discoloring effects and odor. Coating compositions comprising such granules have "cleaner" colors and no unpleasant amine odor. Amines may be used in the curing stage (as hereinunder described) but the quantity involved here is very small compared to the quantities formerly required for stabilization of water in the solution in monomer of the polyester resin.

By "dimensionally stable" granules, we mean granules which on drying exhibit a shrinkage in diameter of not more than 5% of the diameter of the "wet" granule. This is measured microscopically by the method described in the specification of U.S. Pat. No. 3,879,314, the disclosures of which are incorporated herein by reference.

Carboxylated unsaturated polyester resins which will cross-link by reaction with unsaturated monomers are well known. Suitable polyester resins are the condensation products of dicarboxylic acids (or their corresponding anhydrides) and dihydric alcohols, polymerizable unsaturation being introduced into the chain by the use of a proportion of $\alpha$, $\beta$-ethylenically unsaturated acid.

The polyester resins from which a selection is made are condensation products of polybasic acids (or the corresponding anhydrides) and dihydric alcohols. Polymerizable unsaturation is introduced into the molecule by the selection of an $\alpha$, $\beta$-ethylenically unsaturated acid, optionally in combination with a saturated acid or anhydride.

Thus suitable acids are, for example:

unsaturated aliphatic acids, e.g. maleic, fumaric and itaconic acids; saturated aliphatic acids, e.g. malonic, succinic, glutaric, adipic, pimelic, azelaic, tetrahydrophthalic, chlorendic and sebacic acids; and saturated aromatic acids, e.g. phthalic, isophthalic, terephthalic, tetrachlorophthalic, trimellitic and trimesic.

Suitable dihydric alcohols are chosen from, for example, ethylene glycol, poly (ethylene glycols) e.g. diethylene glycol, hexane 1, 6-diol, propylene glycol, dicyclohexanol and neopentyl glycol. Alternatively, the alcohol may be one which initially contained three or more hydroxyl groups, the groups in excess of two optionally being at least in part etherified with, for example, a monohydric alcohol e.g. methanol, ethanol and n-butanol or esterified with a monobasic acid, e.g. benzoic acid, p tert.-butyl benzoic acid and chain-like aliphatic acids of up to 18 carbon atoms chain length e.g. coconut oil monoglyceride.

The methods by which unsaturated polyesters of this type are formulated and made are well known in the art.

It is essential to the working of our invention that the acid value of the polyester lie within certain limits. We have found it essential to select polyesters whose acid values lie in the range 5–50 mg KOH/g, preferably 10–25 mg KOH/g.

The unsaturated monomer in which the unsaturated polyester resin is dissolved and crosslinked must be essentially water-insoluble. Monomers which have a solubility at 20° C. of less than 5% (w/w) in water are considered to be suitably water-insoluble for our purpose. A single monomer or a mixture of monomers may be used and in general the monomer will contain only a single polymerizable double bond. However, it is known that poly-functional monomers, that is, monomers containing more than one polymerizable double bond, are also used to cross-link unsaturated polyester resins. Such poly-functional monomers are, however, normally present only as a minor constituent of a mixture of monomers, the major proportion of which is monofunctional monomer. Hence mixtures comprising e.g. divinyl benzene may be used in the performance of our invention.

The preferred ethylenically unsaturated monomers for general use in our process are selected from styrene, the mixed isomers of methyl styrene commercially available as 'vinyl toluene' and methyl methacrylate, because of the ease with which they can be copolymerized with the unsaturated polyester resin. For the best results, we prefer that the monomer shall comprise at least 50% by weight of styrene.

The choice of monomer is not, however, restricted to the above monomers alone. Bearing in mind the requirements that the total monomer must be essentially insoluble in water and also be a solvent for the unsaturated polyester resin, there may be present in a minor proportion other polymerizable unsaturated monomers to, for example, modify the physical properties of the co-reacted resins. Typical co-monomers are, for example, ethyl acrylate, n-butyl methacrylate, acrylonitrile, and triallyl cyanurate. In general, we have found that the upper limit of usefulness of such monomers is 10% by weight based on the total monomer used. Higher concentrations give granules which are either too brittle or too rubbery to be used effectively in paints.

Optionally a few percent by weight of a non-polymerizing organic liquid, e.g. n-butanol or toluene, may be mixed with the monomer to increase the solubility of the polyester resin therein or may be introduced as an incidental part of the process, e.g. in preparing the polyester.

The initial stage in the preparation of dimensionally stable granules according to the present invention is the emulsification of water into the solution in ethylenically unsaturated monomer of carboxylated unsaturated polyester (the solution in ethylenically unsaturated monomer of carboxylated unsaturated polyester resin shall hereinafter be referred to as "the polyester solution" and the emulsion of water in the polyester solution shall hereinafter be referred to as "the first emulsion"). This is carried out by mechanical agitation which is continued until the disperse water droplets are approximately the size of the desired vesicles. The agitation is carried out in the presence of a base which may be present in the polyester solution, the water or both. The base is a metal oxide, hydroxide or salt, wherein the metal is chosen from the group consisting of calcium, magnesium, barium, titanium, zinc, lead, strontium and cobalt. We believe, without restricting our invention in any way, that the stabilization of the disperse water phase in the polyester solution is achieved by an acid-base interaction of the base with the carboxyl group of the polyester resin. The bases of our invention must thus be capable of participating in such an interaction, and any metal oxide, hydroxide or salt which does not is not a base for the purposes of this invention. One particular example of this is titanium dioxide which, although satisfactory for use in its hydrated (titanium hydroxide) form, does not work in its anhydrous (titanium dioxide) form. Where a metal salt is used, the pKa value of the conjugate acid of the anion must be greater than 2. Thus, a metal salt having an anion the conjugate acid of which has a pKa value of less than 2, for example calcium sulphate and magnesium chloride, will not work in our invention. Compounds which are bases for the purposes of our invention include titanium hydroxide, calcium hydroxide, zinc oxide, calcium carbonate, cobalt aytenate, barium hydroxide, strontium carbonate and basic lead carbonate. We have found that, for our purposes, magnesium oxide gives the best results and this is our preferred base. The base should be present in the quantity of from 0.3 equivalents of metal cation per equivalent of carboxyl group to that quantity required for complete neutralization of the carboxyl groups.

If it is required that the granules be pigmented, the pigment may be dispersed in the polyester solution prior to the emulsification of water therein, or into the water to be emulsified therein or into both, the pigmentation of the water being an especially convenient method. Pigmentation may be carried out using methods and dispersing agents known to the art. The pigment may be a primary white opacifying pigment such as titanium dioxide or it may be selected from the wide range of colored pigments used by the art. It may also be an extender pigment such as mica, clay or chalk. A further method of pigmentation is the addition of base in excess of the quantity needed for complete neutralization of the carboxyl groups of the polyester resin. All of the bases of our invention are capable of acting as extenders and some of them, for example, zinc oxide, are primary opacifying pigments in their own right. Thus, the addition of a quantity of base in excess of that required for the complete neutralization of the carboxyl groups for the purpose of pigmentation is encompassed by our invention.

The first emulsion is dispersed in water which contains a stabilizer for the dispersed first emulsion particles and stirred until the desired granule size is achieved. The stabilizer may be chosen from the wide range of materials known to be suitable for this purpose but we have found that an especially suitable material is a water-soluble partially hydrolyzed poly(vinyl acetate) with a molecular weight of about 100,000 and a degree of hydrolysis of 85–90%. As a general guide, we have found that a concentration of stabilizer of the order of 0.1–1.0% by weight of the water gives satisfactory results.

An increase in the viscosity of the water can often assist in the dispersion of the emulsion; such an increase can be achieved by the addition to the water of a water-soluble polymeric thickener. Suitable thickeners are well known to the art and include such compounds as hydroxyethyl cellulose, typically used at a concentration of about 0.3% by weight of the water phase.

Polymerization of the polyester resin is effected by free radical means. This can be achieved by the use of a free radical initiator such as an organic peroxide or by exposure to a radiation source such as ultra-violet radiation or a radio-active element. When a free radical initiator is used it is conveniently dissolved in the polyester resin solution before the dispersion of the solution in water. Our preferred initiation system is a redox system of diethylene triamine and cumene hydroperoxide triggered by ferrous ions derived from ferrous sulphate.

The aqueous slurry of vesiculated polyester granules thus formed may be used directly in an aqueous latex paint, or it may be used directly in an aqueous latex paint, or it may be dewatered, by an convenient means, for example the method described in U.S. Pat. No. 4,154,923, and subsequently redispersed in an aqueous or non-aqueous medium, or incorporated into a paste, for example, for use as a filler or a putty. The beads prepared by the process of this invention are often noticeably whiter than those prepared by known methods, and paints incorporating them exhibit this improvement in whiteness. This is true even of beads where a salt such as cobalt naphthenate has been used-cobalt naphthenate imparts a very slight violet tinge to the beads, but this is not noticeable in a paint film comprising such beads and even helps to give an impression of increased whiteness by imparting to the observer a distinct impression of non-yellowness.

The invention is illustrated by the following example in which all parts are expressed by weight.

EXAMPLE 1

Preparation of 25 μm pigmented, vesiculated polyester resin granules using magnesium oxide base.

The following materials and quantities were used;

| | | Parts |
|---|---|---|
| A | water | 3.088 |
| | surfactant[1] | 1.595 |
| | antifoam ("Bevaloid"* 60 ex Richard Hodgson) | 0.016 |
| B | titanium dioxide pigment ("Tioxide"* RHD 6 ex Tioxide International Ltd.) | 10.601 |
| C | water | 1.029 |
| D | polyester[2] | 8.686 |
| | styrene | 4.817 |
| | magnesium oxide | 0.045 |
| E | water | 1.647 |
| F | hydroxy ethyl cellulose solution[3] | 4.117 |
| | poly(vinyl alcohol) solution[4] | 6.175 |
| | surfactant ("Aerosol"* MA ex American Cyanamid Co.) | 0.103 |
| | water | 32.934 |
| G | water | 24.701 |
| H | cumene hydroperoxide[5] | 0.206 |
| | diethylene triamine | 0.051 |
| | ferrous sulphate | 0.003 |
| I | bactericide ("Proxel"* PL ex ICI Australia Ltd.) | 0.021 |
| | 0.9 ammonia solution | 0.165 |

[1] A 33% wt. solids aqueous solution of a styrene-maleic anhydride resin (SMA 1440A ex Sinclair Petrochemicals, Inc.) neutralized with 2-amino-2-methyl-propanol was used.
[2] A 65% weight solids solution of a 3.11/1/4.73 (molar) fumaric acid/phthalic anhydride/propylene glycol polyester in styrene was used.
[3] A 1.5% weight solids aqueous solution of "Natrosol"* 250 HR (ex Hercules Powder Co.) was used.
[4] A 7.5% weight solids aqueous solution of "Poval"* 224G (ex Kuraray Rayon) was used.
[5] A commercially-available 90% weight active ingredients was used.
*trade mark The materials A were mixed and the pigment B added to A with stirring. Stirring was continued at high speed until the pigment was completely dispersed and the water C was then added to give a millbase.

The materials D were mixed until the magnesium oxide was completely dispersed and the water E was then added to and emulsified into D with high speed mixing.

The millbase was added to this emulsion and similarly emulsified into it until the dispersed particles of millbase were about 1 μm in diameter. This is "the first emulsion".

The materials F were blended together and the first emulsion added to it with high speed stirring, the stirring being continued until the globules of first emulsion were 25 μm in diameter. All but one part of the water G was added to this "double" emulsion.

The diethylene triamine and ferrous sulphate of H were slurried in 0.5 parts each of the water G and then the materials H were added to the double emulsion in the order shown above with sufficient stirring to incorporate them. Stirring was then discontinued and the mixture allowed to cure overnight.

Finally, the bactericide of I was added with stirring and the pH of the mixture adjusted to 8.5–9.5 with ammonia solution.

The final product was a 23.6% weight solids slurry of crosslinked polyester resin granules of 25 μm maximum diameter. These were tested for shrinkage by the method of U.S. Pat. No. 3,879,314 and were found to have a shrinkage of less than 5%.

EXAMPLE 2

Demonstration of the use of other bases.

Example 1 was repeated except that the magnesium oxide was substituted by a chemically equivalent quantity of one of the compounds in the following table:

| Oxides | | Hydroxides | | Salts | |
|---|---|---|---|---|---|
| (a) | lead oxide | (h) | calcium hydroxide | (n) | calcium carbonate |
| (b) | cobalt oxide | (i) | titanium hydroxide | (o) | magnesium carbonate |
| (c) | manganese dioxide | | | (p) | magnesium sulphate |
| (d) | calcium oxide | (j) | barium hydroxide | (q) | manganese chloride |
| (e) | zinc oxide | | | (r) | cobalt aytenate |
| (f) | titanium dioxide | (k) | aluminium hydroxide | (s) | aluminium sulphate |
| (g) | vanadium pentoxide | (l) | strontium hydroxide | (t) | magnesium orthophosphate |
| | | (m) | ammonium hydroxide | (u) | magnesium acetate |
| | | | | (v) | basic lead carbonate |
| | | | | (w) | strontium carbonate |

Of these preparations, those which utilized the following materials were found to give satisfactory granules which passed the shrinkage test;

| Oxides | Hydroxides | Salts |
|---|---|---|
| (a) | (h) | (n) |
| (b) | (i) | (o) |
| (d) | (j) | (r) |
| (e) | (l) | (t) |
| | | (u) |
| | | (v) |
| | | (w) |

The remaining preparations did not give granules because of failure to form a satisfactorily stable first emulsion or double emulsion. It can be seen from these results that only the metal cations according to the invention gave the desired results and that, when salts were used, only those salts whose conjugate acids had pKa values of greater than 2 gave the desired results.

EXAMPLE 3

Demonstration of the variation of the quantity of base present.

In Example 1, 0.4 equivalents of magnesium cation per equivalent of polyester carboxyl group was used. The preparation of Example 1 was repeated using the following quantities of magnesium oxide in place of those in that example;

| Weight of MgO (parts) | equivalents for equivalent of polyester carboxyl group |
|---|---|
| 0.028 | 0.25 |
| 0.079 | 0.70 |
| 0.113 | 1.00 |
| 0.170 | 1.50 |

All of the preparations gave vesiculated granules with shrinkages of less than 5% except for that which utilized 0.25 equivalents of magnesium cation per polyester carboxyl group; in this case it was not possible to form a suitably stable first emulsion.

EXAMPLE 4

Demonstration of the use of a number of different polyester resins.

Example 1 was repeated but using an identical weight of each of the following polyester resins;
(a) 374/2.46/0.792 propylene glycol/fumaric acid/phthalic anhydride polyester, acid value 40;
(b) 4.4/1/2/1 propylene glycol/adipic acid/fumaric acid/phthalic anhydride polyester, acid value 20; and
(c) 5.9/3.1/1 propylene glycol/maleic acid/phthalic anhydride polyester, acid value 5.2.

All of the preparations gave vesiculated granules with shrinkages of less than 5%.

EXAMPLE 5

Demonstration of the use of a variety of unsaturated monomers.

Example 1 was repeated, substituting the following unsaturated monomer for the 4.817 parts of styrene used in that example;

| Monomer(s) | Weight (parts) |
|---|---|
| (a) styrene | 2.408 |
| methyl methacrylate | 3.087 |
| (b) styrene | 4.407 |
| n-butyl methacrylate | 0.410 |

Both preparations gave vesiculated granules with shrinkages of less than 5%.

We claim:

1. A process of preparing an aqueous slurry of vesiculated granules of crosslinked polyester resin which granules have a maximum shrinkage on drying of 5% of the granule diameter, the process comprising the steps of
   (a) emulsifying water into a solution in essentially water-insoluble $\alpha$, $\beta$-ethylenically unsaturated monomer of a carboxylated unsaturated polyester resin, in the presence of a base, to give a stable emulsion of water in polyester solution;
   (b) dispersing this emulsion into water containing a stabilizer for the resulting droplets of emulsion; and
   (c) initiating addition polymerization within the droplets to convert them to crosslinked vesiculated polyester resin;
characterized in that
   (i) the acid value of the polyester is from 5–50 mg KOH/g;
   (ii) the base is a metal oxide, hydroxide or salt wherein the metal cation is chosen from the group consisting of calcium, magnesium, barium, titanium, zinc, lead, strontium and cobalt and, where a metal salt is used, the pKa value of the conjugate acid of the anion is greater than 2; and
   (iii) the base is present to the extent of from 0.3 equivalents of metal cation per equivalent of polyester carboxyl group to that quantity required for the complete neutralization of all the carboxyl groups.

2. A process according to claim 1 characterized in that the base is magnesium oxide.

3. A process according to claim 1 characterized in that the acid value of the polyester resin is from 10–25 mg KOH/g.

4. A process according to claim 1 characterized in that the monomer comprises at least 50% by weight of styrene.

5. A process according to claim 1 characterized in that the granules comprise pigment.

6. An aqueous slurry of vesiculated granules prepared by a process according to claim 1.

* * * * *